United States Patent
Worrel

(10) Patent No.: US 8,251,463 B2
(45) Date of Patent: Aug. 28, 2012

(54) VEHICLE REGENERATIVE BRAKING SYSTEM WITH SYSTEM MONITOR AND REDUNDANT CONTROL CAPABILITY

(75) Inventor: Peter F. Worrel, Troy, MI (US)

(73) Assignee: Ford Global Technologies, Dearborn, MI (US)

(*) Notice: Subject to any disclaimer, the term of this patent is extended or adjusted under 35 U.S.C. 154(b) by 2029 days.

(21) Appl. No.: 10/708,854

(22) Filed: Mar. 29, 2004

(65) Prior Publication Data

US 2004/0164612 A1 Aug. 26, 2004

Related U.S. Application Data

(63) Continuation-in-part of application No. 10/063,193, filed on Mar. 28, 2002, now abandoned.

(51) Int. Cl.
*B60T 8/64* (2006.01)

(52) U.S. Cl. ......... 303/151; 303/155; 303/152; 303/177

(58) Field of Classification Search .............. 303/152, 303/155, 166, 177, 178, 151
See application file for complete search history.

(56) References Cited

U.S. PATENT DOCUMENTS

| | | | | |
|---|---|---|---|---|
| 4,094,555 A * | 6/1978 | Byrne et al. | | 303/150 |
| 5,322,352 A * | 6/1994 | Ohno et al. | | 303/3 |
| 5,372,411 A * | 12/1994 | Gerstenmaier et al. | | 303/182 |
| 5,378,053 A | 1/1995 | Patient et al. | | |
| 5,511,859 A | 4/1996 | Kade et al. | | |
| 5,549,371 A * | 8/1996 | Konaga et al. | | 303/152 |
| 5,615,933 A | 4/1997 | Kidston et al. | | |
| 5,669,679 A | 9/1997 | Hammond et al. | | |
| 5,839,800 A * | 11/1998 | Koga et al. | | 303/152 |
| 5,853,229 A | 12/1998 | Willmann et al. | | |
| 6,158,822 A | 12/2000 | Shirai | | |
| 6,176,556 B1 | 1/2001 | Kizer et al. | | |
| 6,186,253 B1 | 2/2001 | Barnhart et al. | | |
| 6,655,754 B2 * | 12/2003 | Crombez et al. | | 303/152 |
| 6,663,197 B2 * | 12/2003 | Joyce | | 303/152 |
| 6,811,229 B2 * | 11/2004 | Soga | | 303/152 |
| 2002/0180266 A1 * | 12/2002 | Hara et al. | | 303/152 |

FOREIGN PATENT DOCUMENTS

JP  406144153  * 5/1994

OTHER PUBLICATIONS

SAE article entitled "Comparison of Control Methods for Electric Vehicle Antilock Braking/Traction Control System" by P. Khatun, C. Bingham and P. Mellor dated Mar. 5-8, 2001.

* cited by examiner

*Primary Examiner* — Bradley King
(74) *Attorney, Agent, or Firm* — Jerome R. Drouillard; David Kelley

(57) ABSTRACT

A system for providing regenerative and friction braking in a vehicle includes a brake controller for determining a desired rate of deceleration from sensor outputs which are responsive to inputs from an operator of a vehicle and a regenerative braking system operatively connected with the brake controller. A brake monitor receives the sensor inputs from the operator of the vehicle and determines an audit range of deceleration for the vehicle. If the audit range of deceleration of the vehicle is not subsequently sensed, the vehicle's driver will be alerted.

11 Claims, 3 Drawing Sheets

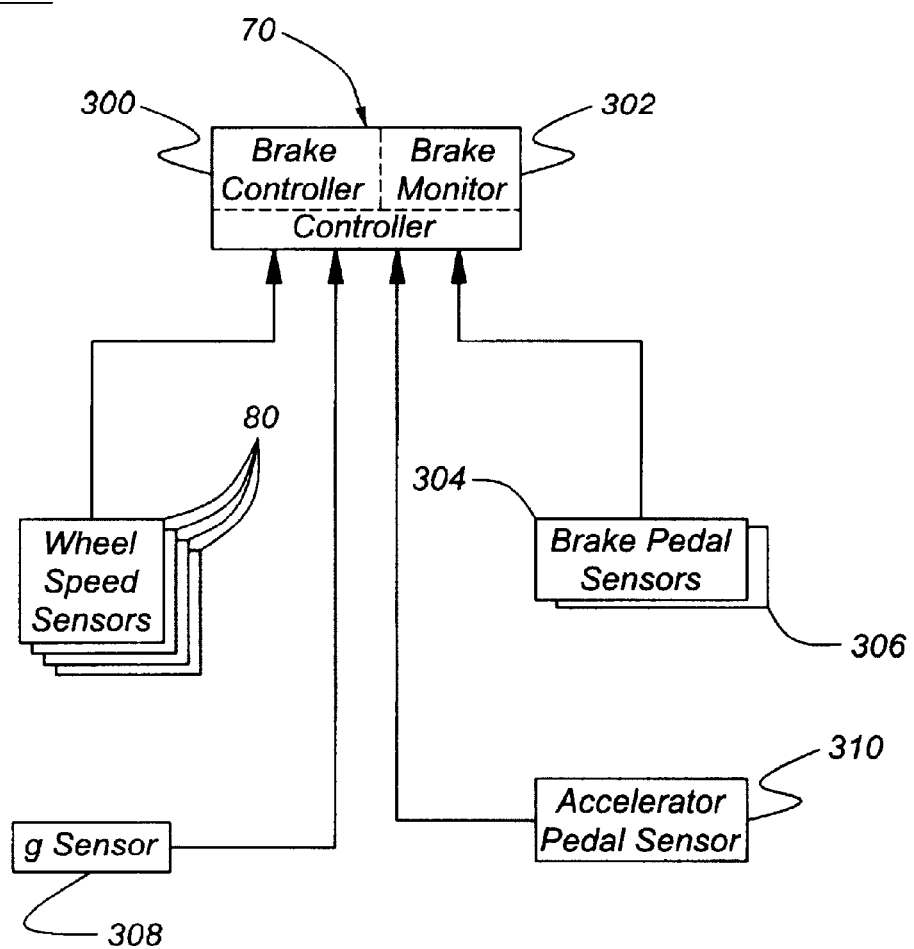

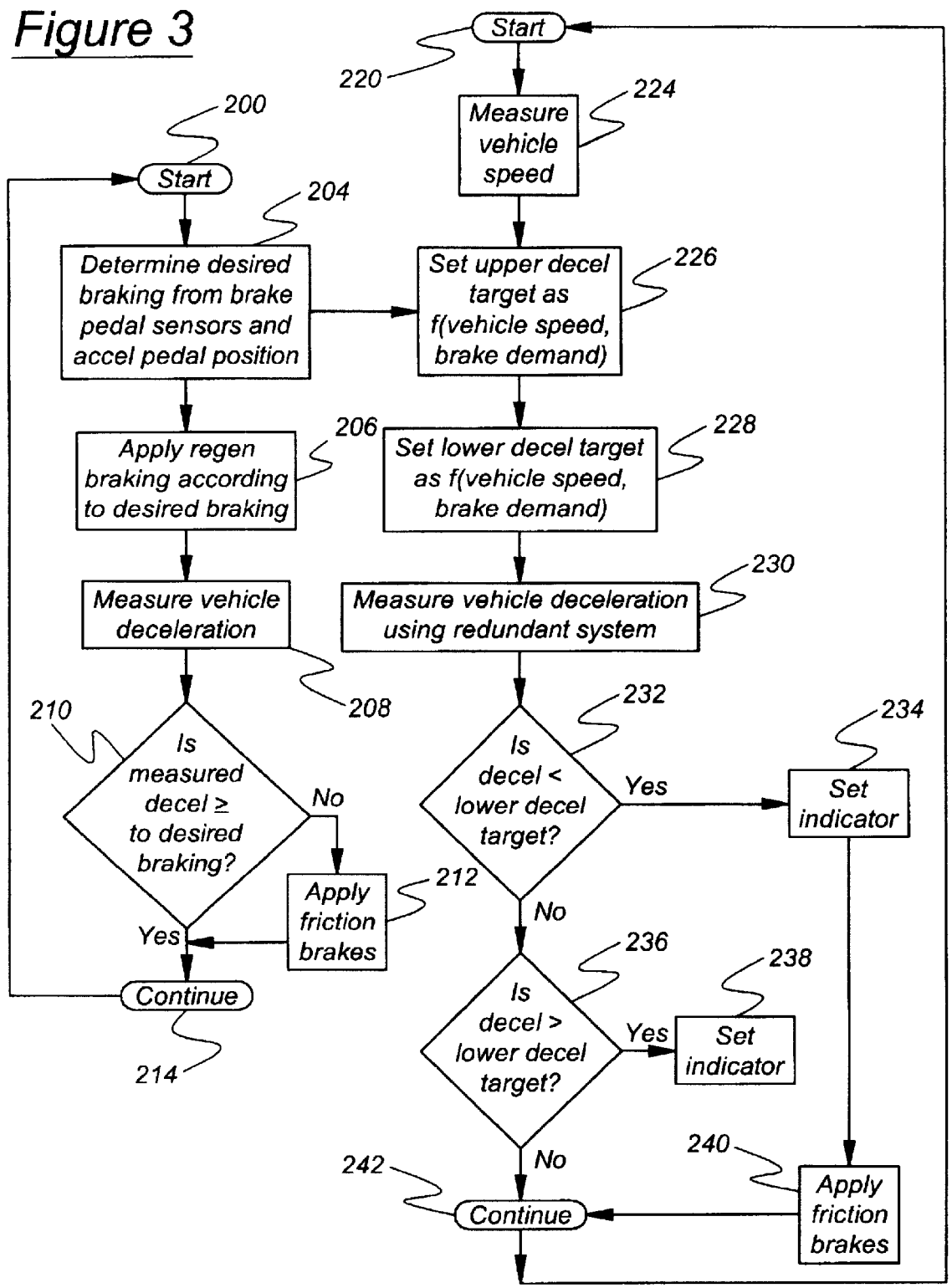

VEHICLE REGENERATIVE BRAKING SYSTEM WITH SYSTEM MONITOR AND REDUNDANT CONTROL CAPABILITY

This application is a continuation-in-part of U.S. application Ser. No. 10/063,193 filed Mar. 28, 2002, now abandoned.

BACKGROUND OF INVENTION

1. Field of the Invention

The present invention generally relates to a method and an apparatus for determining whether a vehicle has been regeneratively braked and for frictionally braking the vehicle in the event that the vehicle has not been regeneratively braked and to a vehicle which incorporates the method and apparatus and more particularly, to a method and apparatus which measures and/or senses the speed and deceleration of a vehicle after a regenerative braking assembly has been activated, effective to determine whether the vehicle has been regeneratively braked and, based upon the measured or sensed speed, activates a frictional brake assembly, effective to brake the vehicle.

2. Background of the Invention

A vehicle may be braked or selectively decelerated or slowed by the use of several techniques or strategies. For example, a hybrid type vehicle may be regeneratively braked by selectively coupling the torque emanating from the transmission or powertrain assembly to an energy storage device (e.g., a storage battery or hydraulic accumulator), thereby conserving energy while slowing or decelerating the vehicle. While such regeneration does desirably slow a vehicle's velocity or speed, it does not typically provide sufficient deceleration to actually stop the vehicle. Hence, these regenerative braking strategies must normally be used in combination with traditional braking strategies which require the use of a frictional brake assembly on each of the wheels. Particularly, a frictional brake assembly selectively engages the wheel on which it is operatively disposed and, in this manner, these frictional brake assemblies selectively and cooperatively decelerate and stop a vehicle.

There exist a number of unique strategies which utilize such frictional braking assemblies and which seek to dynamically distribute the amount of braking between braking assemblies located at the rear of the vehicle (i.e., behind the driver) and the front of the vehicle in order to maintain overall vehicular stability. Typically, the vehicle is initially regeneratively braked in order to maximize the amount of energy which may be regeneratively stored and concomitantly decrease the use of the frictional brakes which wear over time and must be replaced or serviced.

It is desirable to confirm whether regenerative deceleration of the vehicle has occurred and/or to confirm that the regenerative braking system is operable in order to avoid a relatively sudden application of the frictional brakes which is necessary in order to achieve the desired vehicular braking. Particularly, such a sudden application of the frictional brakes both reduces the operating life of these brakes, provides discomfort and annoyance to the passengers of the vehicle, and oftentimes prevents a desired brake distribution to occur. The present method and apparatus provides this confirmation benefit and provides a strategy which eliminates or reduces the need to suddenly and fictionally brake a vehicle due to an inability of the regenerative braking system to supply the desired braking.

The current state of the art is generally shown by U.S. Pat. Nos. 5,378,053, and 5,839,800. The '053 patent discloses a regenerative braking system which alerts the vehicle's driver that a system fault has occurred. The '800 patent uses an accelerometer to detect operation of a regenerative braking system. However, neither the '053 patent nor the '800 patent teaches that operation of a regenerative braking system should be monitored or shadowed by a redundant system, so as to improve the reliability of the overall regenerative braking system.

SUMMARY OF INVENTION

A system and method according to the present invention overcomes some or all of the previously delineated drawbacks of prior braking systems and strategies. According to one aspect of the present invention, a system for providing regenerative and friction braking in a vehicle includes a brake controller for determining a desired rate of deceleration from sensor outputs which are responsive to inputs from an operator of the vehicle, and a regenerative braking system operatively connected with said brake controller and with one or more roadwheels of the vehicle, with the regenerative braking system being commanded by said brake controller to produce a braking torque corresponding to the desired rate of deceleration. A primary speed sensing system, operatively connected with said brake controller, determines the speed and deceleration of the vehicle, and a primary comparator, operatively connected with the brake controller, compares the desired rate of deceleration with the rate of deceleration determined by the primary speed sensing system.

A brake monitor receives the sensor outputs from the operator of the vehicle, and determines an audit rate of deceleration of the vehicle. A redundant deceleration sensor, operatively connected with the brake monitor, determines the vehicle's deceleration.

A secondary comparator, operatively connected with said brake monitor, compares the audit rate of deceleration with the output from the redundant deceleration sensor, and a friction braking system, operatively connected with both said brake controller and with said brake monitor, provides additional braking in the event that the comparison results from either the primary comparator or the secondary comparator indicate that said regenerative braking system is not producing the desired rate of deceleration.

The brake monitor preferably determines an audit rate of deceleration of the vehicle including lower and upper deceleration targets, with the secondary comparator comparing the output from the redundant deceleration sensor with both of these deceleration targets.

According to another aspect of the present invention, the primary speed sensing system may include at least one wheel speed sensor, and the redundant deceleration sensor may include a g-force sensor. Alternatively, the primary speed sensing system may include a g-force sensor, and the redundant deceleration sensor may include at least one wheel speed sensor.

According to another aspect of the present invention, an indicator is provided for the purpose of advising an operator of the vehicle that a potential anomaly is present within the regenerative braking system.

According to yet another aspect of the present invention, a method for operating a vehicle regenerative braking system with a system monitor and redundant control capability, includes the steps of determining a desired rate of deceleration from sensor outputs which are responsive to inputs from an operator of the vehicle, and commanding a regenerative braking system to produce a braking torque corresponding to the desired rate of deceleration, followed by the step of measuring the speed and deceleration of said vehicle by means of a primary speed sensor, and comparing the desired rate of deceleration with the measured rate of deceleration, by means of a primary comparator.

Additional steps according to the present inventive method include determining an audit range of acceptable deceleration of the vehicle from the sensor outputs which are responsive to inputs from the driver of the vehicle, and measuring the vehicle's deceleration by means of a redundant deceleration sensor. The audit range rate of deceleration is compared with the output from the redundant deceleration sensor by means of a redundant comparator, and in the event that the comparison results from either the primary comparator or the redundant comparator indicate that the regenerative braking system is not producing the commanded rate of deceleration, friction braking will be applied, and the vehicle's operator will be advised that an anomaly exists in the regenerative braking system.

Other features and advantages of the present invention will become apparent from a reading of the following detailed description of the preferred embodiment of the invention and by reference to the following drawings.

BRIEF DESCRIPTION OF DRAWINGS

FIG. 2 is an expanded block diagram of a portion of the vehicle of FIG. 1.

FIG. 3 is a flowchart of a method according to one aspect of the present invention.

DETAILED DESCRIPTION

Figure 1:
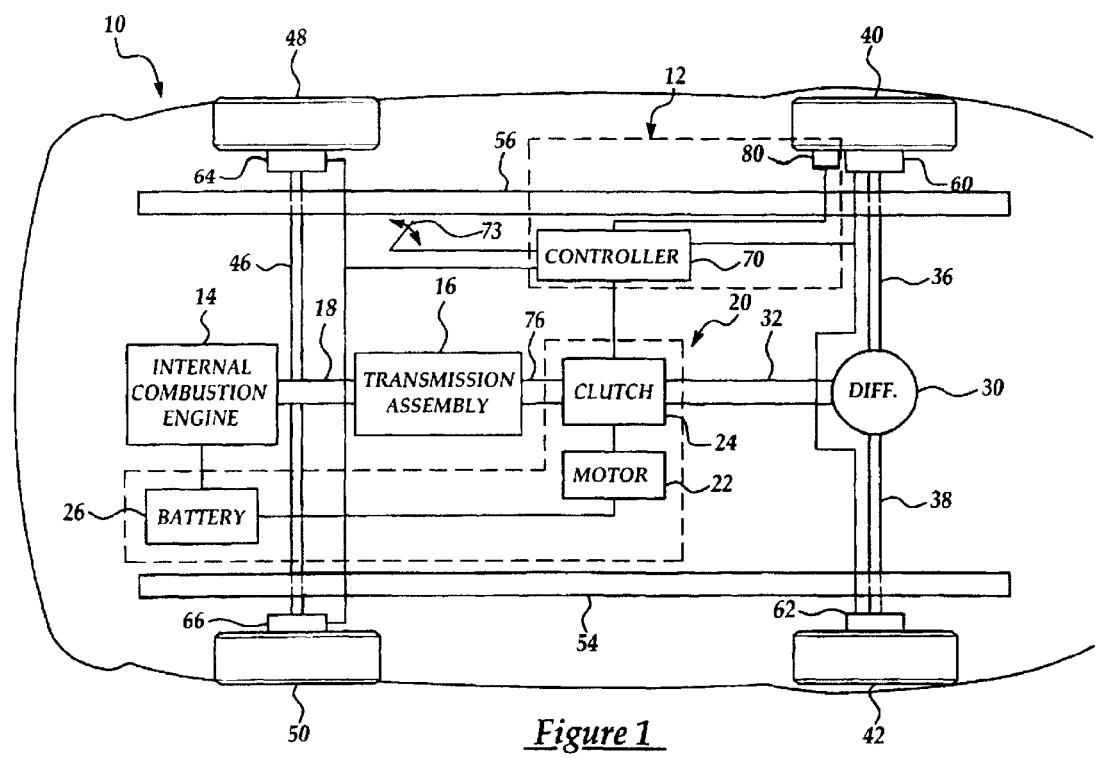
FIG. 1 is a block diagram of a vehicle incorporating the method and system of the present invention.

Referring now to FIG. 1, there is shown a vehicle 10 which includes a regenerative braking confirmation assembly 12 which is made in accordance with the teachings of the preferred embodiment of the invention.

Particularly, vehicle 10 includes a torque generator 14, such as but not limited to an internal combustion engine or fuel cell assembly, and a transmission assembly 16 which is physically coupled to the torque generator 14 by a powertrain member 18. Vehicle 10 further includes a regenerative brake assembly 20 which comprises a motor 22, a clutch 24, and a battery 26. Particularly, the clutch 24 is physically coupled to the transmission 16 by the output shaft 76, and to the motor 22. The motor 22 is electrically coupled to the battery 26 and the battery 26 may comprise a conventional vehicular battery.

Further, the vehicle 10 includes a differential assembly 30 which is physically coupled to the clutch 24 by a powertrain member 32. Moreover, vehicle 10 includes a pair of rear axles or halfshafts 36, 38 which are each coupled to the differential assembly 30 and to a respective rear wheel 40, 42. The vehicle 10 also includes a front axle 46 which is coupled to a pair of front wheels 48, 50, and frame members 54, 56 which are coupled to the front axle 46. Frame member 54 is further coupled to the rear axle 38 while the frame member 56 is coupled to the rear axle 36.

Vehicle 10 further includes frictional brake assemblies 60, 62, 64, and 66 which respectively reside upon or in close proximity to wheels 40, 42, 48, and 50 and which selectively and frictionally brake these respective wheels 40, 42, 48, and 50, effective to slow or stop the vehicle 10 (e.g., to brake the vehicle 10), and a controller 70 which is operable under stored program control and which is physically and communicatively coupled to the clutch 24 and to the frictional brake assemblies 60-66. Vehicle 10 also includes a selectively depressible brake request member or brake pedal 73 which is coupled to the controller 70. That is, controller 70, in one embodiment, forms part of the regenerative braking confirmation assembly 12 and also provides other vehicular functions which are set forth below. In other non-limiting embodiment, a separate controller may be used to provide the regenerative braking confirmation function of the preferred embodiment of the invention.

It should be realized that only the relevant portions of vehicle 10 are shown within FIG. 1 and described above and that while the vehicle 10 discloses a rear wheel drive vehicle, the present invention is applicable to a wide variety of vehicular architectures, including but not limited to a front wheel drive vehicle, an all wheel drive vehicle, and/or an on demand drive vehicle and that nothing in this description is meant to limit the applicability of the present invention only to the type of vehicle which is shown in FIG. 1.

In conventional operation, torque is produced by the torque generator 14 and is communicated to the transmission 16 by the drivetrain member 18. The transmission 16 then outputs at least a portion of the received torque by the use of the output shaft or member 76 which is coupled to the clutch 24 and to the transmission 16. Typically, the controller 70 controllably causes the clutch 24 to communicate the torque which is output from the transmission 16 (i.e., from the shaft 76) to the differential 30, by the use of powertrain member 32. The differential 30 then communicates the torque to the axles 36, 38, effective to allow the wheels 40, 42 to rotate and to allow the vehicle 10 to be driven.

When the controller 70 senses a depression of the member 73, the controller 70 controllably causes the clutch 24 to communicate the torque emanating from the output member 76 to the motor 22. The received torque causes the motor 22 to function as a generator and to communicate the generated electrical energy into the battery 26, thereby conserving energy (e.g., transforming the received kinetic energy into electrical energy) while braking or decelerating the vehicle 10 (e.g., regeneratively braking the vehicle 10). When the maximum allowable amount of regenerative braking has been achieved and additional amounts of braking have been requested, the controller 70 activates the frictional braking assemblies 60-66. It should be realized that a wide variety of frictional braking assemblies 60-66 may be employed such as those which are hydraulically or pneumatically activated and those which are of the anti-lock type. Moreover, it should be appreciated that a wide variety of regenerative braking assemblies may be used to replace the assembly 20, including but not limited to those including a flywheel which receives torque from the clutch 24, and that nothing in this description is meant to limit the present invention to use with a certain type of regenerative braking assembly or frictional braking assembly.

Regenerative braking confirmation assembly 12 includes or makes use of the controller 70. In other non-limiting embodiments, one or more controllers may be used to perform the functionality and methodology of the preferred embodiment of the invention. Nothing in this application is meant to limit the use of the present invention to a certain type of controller architecture. Assembly 12 further includes at least one speed sensor 80 which is coupled to the controller 70 and which is adapted to sense the speed of the wheel 40 and to communicate the sensed speed to the controller 70. While a single sensor 80 is shown in FIG. 1, it should be appreciated that additional numbers of sensors may be employed in other non-limiting embodiments of the invention on any or all of the other wheels 42, 48 and 50.

Hence, according to the teachings of the preferred embodiment of the invention, when controller 70 causes the clutch 24 to regeneratively brake the vehicle 10, the controller 70 communicates with the at least one speed sensor 80 in order to ascertain whether the vehicle 10 is decelerating (i.e., whether the vehicle 10 is being regeneratively braked). If, after some predetermined period of time, vehicular deceleration is not sensed (or, in one non-limiting embodiment of the invention, if a certain predetermined amount of vehicular deceleration is not sensed), the controller 70 automatically (i.e., without intervention by the user or operator of the vehicle) causes the frictional braking assemblies 60-66 to decelerate the vehicle 10, and may provide status or other types of information to the user/driver indicating that the desired regenerative braking has not occurred or is not occurring. In one non-limiting embodiment of the invention, the vehicle deceleration may be calculated by conventional slip control equations which utilize the wheel speed which is provided by the at least one sensor 80. Such a calculation may occur within controller 70. If additional wheel sensors are utilized, these equations are sequentially and separately applied to the respective wheel speed data emanating from these other sensors and the controller 70 only activates the frictional braking assemblies 60-66 if all of the data (for each wheel 40, 42, 48, 50) shows a lack of deceleration. The use of such slip control equations is explained within the paper entitled Comparison of Control Methods for Electric Vehicle Antilock Braking/Traction Control Systems, which is authored by P. Khatun, C. M. Bimgham, and P. H. Mellor, which is published by the Society of Automotive Engines (2001-01-0596) and which is fully and completely incorporated herein by reference, word for word and paragraph for paragraph. In another non-limiting embodiment, discrete positions of the member 73 are calibrated to ascertain the amount of deceleration which is respectively requested by each position. This calibration data (along with the data associated with the current position of the member 73 from brake pedal sensors 304 and 306, as well as accelerator pedal sensor 310) is stored within the controller 70 and is used, by the controller 70, in combination with the data emanating from the at least one speed sensor 80 to not only ascertain whether the vehicle 10 is being decelerated, but to determine whether the requested amount of deceleration has been achieved. In an alternate embodiment of the invention, the frictional braking is not applied until it is determined that the full amount of the requested regenerative braking has not been applied to vehicle 10.

In an alternate embodiment, torque generator 14 may comprise a reservoir of fluid in combination with a hydraulic pump which is communicatively coupled to the reservoir and controllably coupled to the controller 70. In this alternate embodiment, powertrain member 18 may be replaced by at least one hydraulic conduit and transmission 16 may be replaced by an assembly which rotates in response to the receipt of fluid. In operation, upon receipt of certain signals from the controller 70, the pump in cooperation with the reservoir will selectively couple the fluid to the transmission which causes the transmission to hydraulically provide positive or negative torque to accelerate or decelerate the vehicle 10.

FIG. 2 illustrates an embodiment of the present invention in which controller 70 is partitioned into a brake controller 300 and brake monitor 302. Controller 70 receives inputs from wheel speed sensors 80, as well as from brake pedal position sensor 304 and brake pressure sensor 306. Controller 70 also receives input from g force sensor 308. Wheel speed sensors 80, in the usual fashion, provide signals related to the rotational speed of each road wheel. These speed signals are differentiated as a function of time to achieve a measurement of the wheels' acceleration and deceleration. Sensor 308, which may comprise either a pendulum type or other type of g force sensor known to those skilled in the art and suggested by this disclosure, provides an independent or redundant reading of the deceleration of the vehicle. Brake pedal sensors 304 and 306 comprise redundant sensors for determining when the vehicle's driver desires that braking commence. Further, accelerator pedal sensor 310, which includes redundant sensing capability, provides yet another independent indication of the vehicle driver's intent to either apply the brake, or to allow the engine compression or rather, simulated engine compression provided by regenerative braking, to slow the vehicle.

Although brake controller 300 and brake monitor 302 are shown as being housed within a single controller 70, those skilled in the art will appreciate in view of this disclosure that the partitioning shown within controller 70 could be accomplished in a variety of ways, commonly employed to ensure redundancy of control system architecture. For example, separate processors could be used, with brake controller 300 and brake monitor 302 sharing only common inputs and to some extent, outputs. Such details are left to the routineer as being beyond the scope of this invention.

FIG. 3 illustrates the functioning of a system according to the present invention. Beginning at block 200, brake controller 300 determines whether braking is being requested, by means of brake pedal sensors 304 and 306 and accelerator pedal position sensor 310. If braking is desired, brake controller 300 applies regenerative braking at block 206 according to the desired braking level. Thereafter, at block 208, vehicle deceleration is measured by differentiating the output from wheel sensors 80. Then, at block 210 the calculated deceleration is compared with the desired rate of deceleration from block 204 by means of a primary comparator. If the measured deceleration is greater than the desired rate of deceleration, brake controller 300 continues the routine at block 214. If, however, the measured deceleration is less than desired rate of deceleration, brake controller 300 applies friction brakes at block 212 and continues.

The sequence beginning at block 220 and continuing to block 242 of FIG. 3 is a brake monitor routine operated by brake monitor 302. This brake monitor routine runs in the background whenever regenerative braking is occurring. At block 224, the vehicle's speed is measured by brake monitor 302 using information from wheel speed sensors 80. At block 226, an upper deceleration target is set as a function of vehicle speed and brake demand, with the brake demand or desired braking value being transferred from block 204 to block 226. Then, at block 228, a lower deceleration target is set as function of vehicle speed and brake demand. Thus, brake monitor 302 is intended to function as a watchdog which will respond when the vehicle's deceleration is either too great or too little. The brake monitor routine continues at block 230 with measurement by brake monitor 302 of the vehicle's deceleration using a redundant system, in this case g force sensor 308. Then, a secondary comparator compares the measured deceleration with the lower decel target at block 232, and if the deceleration is less than the lower decel target, the routine moves to block 234, where an indicator is set to advise the driver of the vehicle that an operational anomaly exists within the regenerative braking system. In other words, the driver is advised of a potential system malfunction. Then, at block 240, friction braking is applied and the routine continues at block 242. If the answer to the question imposed at block 232 is "no", the routine moves to block 236 wherein the rate of deceleration is compared by the secondary comparator within controller brake monitor 302 with the upper deceleration target. If the answer at block 236 is "yes", the deceleration is greater than commanded, and the routine sets an indicator at block 238 to warn the vehicle's operator of a potential anomaly in the regenerative braking system.

Taken together, the lower deceleration target and the upper deceleration target comprise an audit range of acceptable deceleration. If the deceleration rate is greater than the upper decel target, an indicator is set at block 238. If however, the deceleration rate is less than the upper decel target at block 236, the routine continues at block 242. Thus, it is seen that additional braking is provided by the friction braking system in the event that the comparison results at either block 210 or blocks 232 or 236 indicate that regenerative braking system is not producing commanded rate of deceleration.

It is to be understood that the invention is not limited to the exact construction and method which has been described above, but that various changes and modifications may be made without departing from the spirit and the scope of the inventions as are set forth in the following claims.

The invention claimed is:

1. A system for providing regenerative and friction braking in a vehicle, comprising:
   a brake controller for determining a desired rate of deceleration from sensor outputs which are responsive to inputs from an operator of the vehicle;
   a regenerative braking system operatively connected with said brake controller and with one or more roadwheels of said vehicle, with said regenerative braking system being commanded by said brake controller to produce a braking torque corresponding to the desired rate of deceleration;
   a primary speed sensing system, operatively connected with said brake controller, for determining the speed and deceleration of said vehicle;
   a primary comparator, operatively connected with said brake controller, for comparing the desired rate of deceleration with the rate of deceleration determined by said primary speed sensing system;
   a brake monitor for receiving said sensor inputs from the operator of the vehicle, and for determining an audit range of deceleration of the vehicle;
   a redundant deceleration sensor, operatively connected with said brake monitor, for determining the vehicle's deceleration;
   a secondary comparator, operatively connected with said brake monitor, for comparing the audit range of deceleration with the output from said redundant deceleration sensor; and
   a friction braking system, operatively connected with both said brake controller and with said brake monitor, for providing additional braking in the event that the comparison results from either the primary comparator or the secondary comparator indicate that said regenerative braking system is not producing the commanded rate of deceleration.

2. A system according to claim 1, wherein said brake monitor determines an audit range of deceleration of the vehicle comprising lower and upper deceleration targets, with said secondary comparator comparing the output from the redundant deceleration sensor with both of said deceleration targets.

3. A system according to claim 1, wherein said primary speed sensing system comprises at least one wheel speed sensor.

4. A system according to claim 1, wherein said redundant deceleration sensor comprises a g-force sensor.

5. A system according to claim 1, wherein said primary speed sensing system comprises a g-force sensor.

6. A system according to claim 1, wherein said redundant deceleration sensor comprises at least one wheel speed sensor.

7. A system according to claim 1, wherein said sensor outputs which are responsive to an operator of the vehicle are outputs from at least one brake pedal sensor and an accelerator pedal sensor.

8. A system according to claim 1, wherein said sensor outputs which are responsive to an operator of the vehicle are outputs from a brake pedal pressure sensor, a brake pedal position sensor, and an accelerator pedal position sensor.

9. A system according to claim 1, further comprising an indicator for advising an operator of the vehicle that an operational anomaly is present in the regenerative braking system.

10. A method for operating a vehicle regenerative braking system with a system monitor and redundant control capability, comprising the steps of:
    determining a desired rate of deceleration from sensor outputs which are responsive to inputs from an operator of the vehicle;
    commanding a regenerative braking system to produce a braking torque corresponding to the desired rate of deceleration;
    measuring the speed and deceleration of said vehicle by means of a primary speed sensor;
    comparing the desired rate of deceleration with the measured rate of deceleration, by means of a primary comparator;
    determining an audit range of acceptable deceleration of the vehicle from said sensor outputs which are responsive to inputs from an operator of the vehicle;
    measuring the vehicle's deceleration by means of a redundant deceleration sensor;
    comparing the audit range of deceleration with the output from said redundant deceleration sensor, by means of a redundant comparator; and
    providing additional braking by means of a friction braking system, in the event that the comparison results from either the primary comparator or the redundant comparator indicate that said regenerative braking system is not producing the commanded range of deceleration.

11. A method according to claim 10, further comprising the step of activating an indicator to alert an operator of the vehicle in the event that the rate of deceleration produced by the regenerative braking system, as measured by the redundant deceleration sensor, does not lie within said audit range rate of deceleration.

* * * * *